United States Patent
Hussaini et al.

(10) Patent No.: US 10,361,444 B2
(45) Date of Patent: Jul. 23, 2019

(54) SOLID-OXIDE FUEL CELL SYSTEMS

(71) Applicant: GENERAL ELECTRIC COMPANY, Schenectady, NY (US)

(72) Inventors: Irfan Saif Hussaini, Glenville, NY (US); Matthew Joseph Alinger, Delmar, NY (US); Andrew Philip Shapiro, Schenectady, NY (US)

(73) Assignee: General Electric Company, Schenectady, NY (US)

(*) Notice: Subject to any disclaimer, the term of this patent is extended or adjusted under 35 U.S.C. 154(b) by 456 days.

(21) Appl. No.: 14/145,088

(22) Filed: Dec. 31, 2013

(65) Prior Publication Data

US 2015/0188173 A1    Jul. 2, 2015

(51) Int. Cl.
   *H01M 8/06* (2016.01)
   *H01M 8/0612* (2016.01)
   (Continued)

(52) U.S. Cl.
   CPC ..... *H01M 8/0618* (2013.01); *H01M 8/04067* (2013.01); *H01M 8/04089* (2013.01);
   (Continued)

(58) Field of Classification Search
   CPC ........... H01M 8/04097; H01M 8/0618; H01M 8/04164; H01M 2008/1293;
   (Continued)

(56) References Cited

U.S. PATENT DOCUMENTS 5,482,791 A * 1/1996 Shingai ............... H01M 8/0612
429/423
6,311,650 B1 11/2001 Lamm
(Continued)

FOREIGN PATENT DOCUMENTS

CN   1948865 A   4/2007
CN   102820480 A   12/2012
(Continued)

OTHER PUBLICATIONS

European Search Report and Written Opinion issued in connection with corresponding EP Application No. 14199454.1-1360 dated May 19, 2015.
(Continued)

*Primary Examiner* — Jonathan G Jelsma
*Assistant Examiner* — Omar M Kekia
(74) *Attorney, Agent, or Firm* — Steven M. Shape; Dennemeyer & Associates, LLC (57) ABSTRACT

The present application provides combined cycle fuel cell systems that include a fuel cell, such as a solid-oxide fuel cell (SOFC), comprising an anode that generates a tail gas and a cathode that generates cathode exhaust. The system or plant may include adding fuel, such as processed or refined tail gas, to the inlet air stream of a reformer to heat the reformer. The system or plant may include removing water from the tail gas and recycling the removed water into an inlet fuel stream. The inlet air stream may be the cathode exhaust stream of the fuel cell, and the inlet fuel stream may be input hydrocarbon fuel that is directed to the reformer to produce hydrogen-rich reformate. The system or plant may direct some of the processed or refined tail gas to a bottoming cycle.

12 Claims, 2 Drawing Sheets

(51) Int. Cl.
  *H01M 8/04119* (2016.01)
  *H01M 8/04089* (2016.01)
  *H01M 8/0637* (2016.01)
  *H01M 8/0662* (2016.01)
  *H01M 8/04007* (2016.01)
  *H01M 8/04291* (2016.01)
  *H01M 8/124* (2016.01)

(52) U.S. Cl.
  CPC ... *H01M 8/04097* (2013.01); *H01M 8/04164* (2013.01); *H01M 8/04291* (2013.01); *H01M 8/0637* (2013.01); *H01M 8/0662* (2013.01); *H01M 2008/1293* (2013.01); *H01M 2250/407* (2013.01); *Y02E 60/563* (2013.01); *Y02E 60/566* (2013.01)

(58) Field of Classification Search
  CPC ......... H01M 2250/407; H01M 8/0637; H01M 8/04067; H01M 8/04089; H01M 8/04291; H01M 8/0662; Y02E 60/563; Y02E 60/50; Y02E 60/525
  USPC ....... 429/408, 410, 413, 414, 415, 417, 420, 429/423, 425
  See application file for complete search history.

(56) References Cited

U.S. PATENT DOCUMENTS

| | | | |
|---|---|---|---|
| 7,285,350 | B2 | 10/2007 | Keefer et al. |
| 7,387,849 | B2 | 6/2008 | Keefer et al. |
| 7,553,568 | B2 | 6/2009 | Keefer |
| 2005/0214609 | A1 | 9/2005 | McElroy |
| 2005/0242588 | A1 | 11/2005 | Washington |
| 2008/0118800 | A1* | 5/2008 | Devriendt ......... H01M 8/04014 429/423 |
| 2008/0187789 | A1* | 8/2008 | Ghezel-Ayagh ........ F02C 1/007 429/414 |
| 2009/0155650 | A1* | 6/2009 | Cui .................. H01M 8/04097 429/420 |
| 2009/0208785 | A1 | 8/2009 | McElroy |
| 2012/0214076 | A1 | 8/2012 | Hakala |
| 2012/0251899 | A1 | 10/2012 | Lehar et al. |
| 2012/0285162 | A1 | 11/2012 | Ahn et al. |
| 2013/0126038 | A1 | 5/2013 | Jamal et al. |

FOREIGN PATENT DOCUMENTS

| | | |
|---|---|---|
| CN | 202855854 U | 4/2013 |
| EP | 1060942 A2 | 12/2000 |
| JP | 2000-228208 A | 8/2000 |
| JP | 2008-030990 A | 2/2008 |
| WO | 2012/170375 A1 | 12/2012 |
| WO | WO2012/170375 * | 12/2012 |
| WO | 2013048705 A1 | 4/2013 |

OTHER PUBLICATIONS

Rosenberg, et al; "Large-SOFC Towards a Large SOFC Power Plant," European Commission 6th Framework Programme, pp. 1-149 (2010).

Vincenzo, et al; "Ejector design and performance evaluation for recirculation of anode gas in a micro combined heat and power systems based on solid oxide fuel cell," Applied Thermal Engineering, vol. 54, pp. 26-34 (2013).

First Office Action and Search issued in connection with corresponding CN Application No. 201410845726.5 dated Mar. 29, 2018.

Machine Translation and Notification of Reasons for Refusal issued in connection with corresponding JP Application No. 2014-259652 dated Jul. 31, 2018.

Machine translation and Second office action and Search issued in connection with corresponding CN Application No. 201410845726.5 dated Dec. 13, 2018 (office action translation is not available).

* cited by examiner

SOLID-OXIDE FUEL CELL SYSTEMS

BACKGROUND

This disclosure relates generally to combined cycle fuel cell systems, and more particularly to high-efficiency solid-oxide fuel cell (SOFC) systems that achieve higher fuel cell conversion efficiencies than that achievable using conventional combined cycle systems.

Fuel cells are electrochemical energy conversion devices that have demonstrated a potential for relatively high efficiency and low pollution in power generation. A fuel cell generally provides a direct current (dc) which may be converted to alternating current (ac) via for example, an inverter. The dc or ac voltage can be used to power motors, lights, communication equipment and any number of electrical devices and systems. Fuel cells may operate in stationary, semi-stationary, or portable applications. Certain fuel cells, such as solid oxide fuel cells (SOFCs), may operate in large-scale power systems that provide electricity to satisfy industrial and municipal needs. Others may be useful for smaller portable applications such as for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents.

In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) or remote reforming of carbon-based feedstocks, such as reforming of the more readily available natural gas and other hydrocarbon fuels and feedstocks. Examples of hydrocarbon fuels include, but are not limited to, natural gas, methane, ethane, propane, methanol, and other hydrocarbons.

Present day examples of combined cycle fuel cell systems routinely achieve at least 50% conversion efficiency. The efficiency of combined cycle fuel cell systems in converting hydrocarbon fuel into electrical energy is limited by loss mechanisms within the system that produce or lose heat and by losses of the fuel cell due to partial utilization of fuel. Typical or common attempts to improve performance or efficiency of combined cycle fuel cell systems at low fuel utilization have involved fuel and/or air-recycling. Fuel recycling in combined cycle fuel cell systems, however, requires large reformers and large high temperature blowers that are costly and technically challenging. Similarly, air recycling in combined cycle fuel cell systems requires high-temperature blowers that are not cost-effective.

In view of the foregoing, there is a need to provide cost-reduction techniques that increase the plant efficiency of combined cycle fuel cell systems through increased fuel cell efficiency that eliminate the need of fuel and/or air recycling that requires costly high temperature blowers and, potentially, heat exchangers.

BRIEF DESCRIPTION

In one aspect, a first exemplary embodiment of a combined cycle fuel cell system is disclosed. The system may include a solid-oxide fuel cell fuel cell, a reforming system, a water separator, a bottoming cycle, and/or a residual tail gas pathway. The solid-oxide fuel cell fuel cell may include an anode configured to generate a tail gas, and a cathode configured to generate a cathode exhaust stream. The reforming system may be configured to receive and output at least a portion of the cathode exhaust stream and convert at least a portion of a mixture of input hydrocarbon fuel and input steam into a hydrogen-rich reformate. The hydrogen-rich reformate may be utilized by the anode of the fuel cell. The water separator may be configured to the receive the tail gas of the fuel cell and remove water from the tail gas to form residual tail gas. The water removed from the tail gas may be directed to the reforming system as steam to form at least a portion of the input steam. The bottoming cycle may include a combustion engine. The residual tail gas pathway may be configured to divert a first portion of the residual tail gas to the bottom cycle to drive the bottom cycle, and to divert a second portion of the residual tail gas to the cathode exhaust stream.

In another aspect, a second exemplary embodiment of a combined cycle fuel cell system is disclosed. The system may include a solid-oxide fuel cell, a reforming system, and/or a bottoming cycle. The solid-oxide fuel cell may include a cathode configured to generate a cathode exhaust, and an anode configured to generate a tail gas. The reforming system may be configured to convert at least a portion of a mixture of input hydrocarbon fuel and input steam into a hydrogen-rich reformate, and to output the hydrogen-rich reformate to the anode of the fuel cell. The system may be configured such that the tail gas is prevented from being input into the anode and cathode of the fuel cell. The system may be configured to direct a first portion of the tail gas to the bottoming cycle to drive the bottoming cycle. The reforming system may be heated to facilitate conversion of the input hydrocarbon fuel and the input steam into the hydrogen-rich reformate by directing through the reforming system at least a portion of heated cathode exhaust that is formed by combusting a second portion of the tail gas in the cathode exhaust.

DRAWINGS

The foregoing and other features, aspects and advantages of this disclosure will become apparent from the following detailed description of the various aspects of the disclosure taken in conjunction with the accompanying drawings, wherein:

FIG. 1 is a diagram illustrating a combined cycle power plant or system that employs a solid-oxide fuel cell (SOFC)

running on reformed fuel (e.g., hydrogen-rich reformate) according to one embodiment of the disclosure.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The embodiments described herein with reference to the figures (and variations thereof) advantageously provide increased plant efficiencies, as compared to prior plant embodiments, of at least about 50%, and potentially within the range of about 50% to about 65%, and potentially preferably within the within the range of about 55% to about 65%, while enabling or providing steam reforming without employing fuel and/or air recycle loops. Thereby, advantages provided by the features described herein include without limitation, include the lack of fuel and/or air cycle loops, minimizing temperature difference across the fuel cell (e.g., an SOFC stack), and relatively high system efficiency at a relatively low fuel utilization rate.

Other embodiments of the present disclosure are also contemplated, as noted in the discussion. While the illustrated exemplary embodiments of the disclosure are shown and discussed with reference to solid-oxide fuel cells, the principles described herein may be applied to comparable fuel-cell technologies (as is known in the art). Further, a vast variety of waste heat and/or fuel recovery cycles and methods for integrating those cycles are also possible using the principles described herein and are hereby contemplated by this disclosure.

Figure 1:
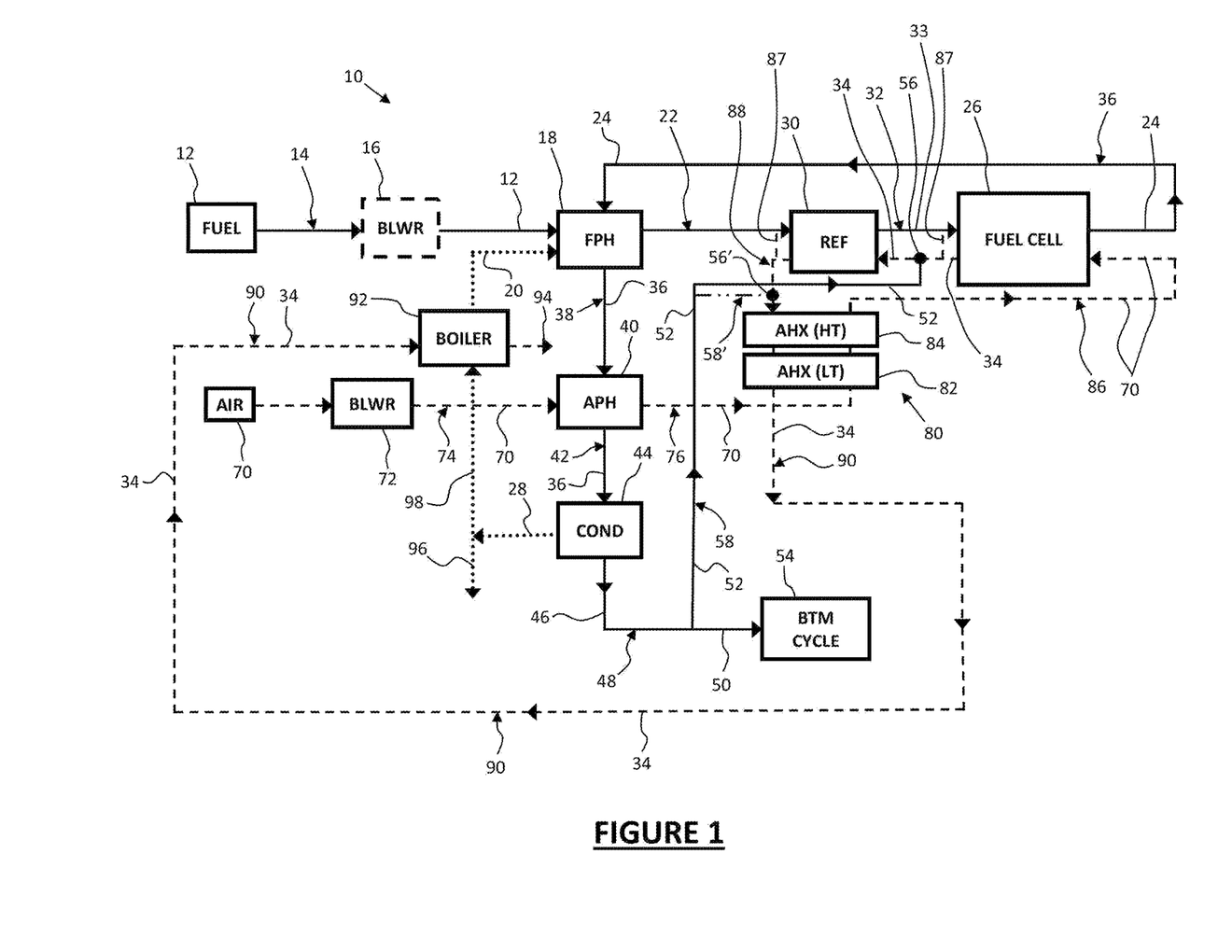

FIG. 1 is a simplified diagram illustrating an exemplary combined cycle power plant or fuel cell system 10 according to the present disclosure that employs a solid-oxide fuel cell (SOFC) 26 running on reformed fuel without recirculation, as explained further below. More specifically, as shown in FIG. 1, inlet fuel 12 from a fuel source is input into the plant or system 10. The input fuel 12 may be obtained, provided, manufactured, refined or otherwise input into the plant or system 10. The input fuel 12 may be any fuel effective in power generation via the fuel cell 26 of the plant or system 10. In some embodiments, the input fuel 12 may be a hydrocarbon fuel or a mixture of hydrocarbon fuels. In some such embodiments, the input fuel 12 may be substantially $CH_4$ (e.g., natural gas or methane).

As shown in FIG. 1, the input fuel 12 may be translated along a first pathway 14 into or to one or more fuel pre-heater 18. In some embodiments, the pathways or passageways of the plant or system 10, including the first pathway 14, may be pipes or other conduits in which the input fuel 12 and other liquids and/or gases flow there through. In some embodiments, the plant or system 10 may include one or more fuel blower 16 effective in pressurizing or otherwise translating a particular amount or rate of the input fuel 12 to the fuel pre-heater 18 along the first pathway 14 (and potentially through other pathways or aspects of the plant or system 10 that are positioned or arranged downstream of the fuel blower 16). In some embodiments however, the fuel blower 16 may not be utilized. For example, the source or origin of the input fuel 12 may include, define or include a sufficient pressure or flow rate such that a sufficient rate or amount of input fuel 12 is fed or translated into the plant or system 10 (e.g., to the fuel pre-heater 18 and aspects or components downstream thereof). The fuel blower 16 may therefore be dependent upon the natural or source conditions (e.g., flow rate) of the input fuel 12 and/or the requirements or operating parameters of the plant or system 10 (e.g., the supply pressure of the input fuel 12).

At or after the fuel pre-heater 18, input water 20 may be added to or mixed with the input fuel 12. For example, as shown in FIG. 1 water 20 may be mixed with, or added to, the input fuel 12 at the fuel pre-heater 18. In some embodiments, water 20 may be mixed with, or added to, the input fuel 12 after (i.e., downstream of) the fuel pre-heater 18 along a second pathway 22. The water 20 mixed with the input fuel 12 at or after the fuel pre-heater 18 may be steam (i.e., at or above about 100 degrees Celsius). As discussed further below, the water 20 (e.g., steam) added to the input fuel 12 may be (or at least include) removed water 28 that was removed or separated from the anode exhaust or tail gas 24 of the fuel cell 26 of the plant or system 10. In some embodiments, the entirety of the water 20 added to the input fuel 12 may be the water 28 that was removed or separated from the anode exhaust or tail gas 24 of the fuel cell 26. The ratio of input fuel 12 and water 20 (e.g., steam) (when added to the input fuel 12) may vary depending upon desired operating parameter of the plant or system 10 (e.g., desired output load). In some embodiments, the mole fraction of the mixture of input fuel 12 and added water 20 (e.g., steam) may be about two-thirds water 20 (e.g., steam) and one-third input fuel 12 (e.g., $CH_4$).

The fuel pre-heater 18 may be configured to receive the input fuel 12 from the first pathway 14, as shown in FIG. 1. As discussed above, the fuel pre-heater 18 may also be configured to receive water 20 (e.g., steam) and, potentially, mix the input water 20 and input fuel 12. The fuel pre-heater 18 may be any fuel pre-heater effective in heating the input fuel 12 (and, potentially, the added water 20). The amount of heat applied to the input fuel 12 (or, potentially, the water 20 and input fuel 14 mixture) by the fuel pre-heater 18 may vary depending upon desired operating parameters of the plant or system 10 (e.g., desired output load). In some embodiments, the fuel pre-heater 18 may be configured to heat the input fuel 12 (or, potentially, the water 20 and input fuel 14 mixture) to at least about 500 degrees Celsius. In some embodiments, the fuel pre-heater 18 may be configured to heat the input fuel 12 (or, potentially, the water 20 and input fuel 14 mixture) to at least about 700 degrees Celsius.

In some embodiments, the fuel pre-heater 18 may be a recuperator or heat exchanger. As shown in FIG. 1, the fuel pre-heater 18 may utilize at least a portion of the anode exhaust or tail gas 24 of the fuel cell 26 of the plant or system 10 to heat the input fuel 12 (and, potentially, the added water 20). The fuel pre-heater 18 may be configured to maintain the tail gas 24 and input fuel 12 (and, potentially, the added water 20) separate and distinct from one another. For example, the fuel pre-heater 18 may utilize the hot tail gas 24 to heat the relatively cooler input fuel 12 (or, potentially, the water 20 and input fuel 14 mixture) via conduction and/or convection without mixing the tail gas and input fuel 12 (or the water 20 and input fuel 14 mixture). Along with the fuel pre-heater 18, the other components or aspects of the plant or system 10 may configured to maintain the tail gas 24 and input fuel 12 (and, potentially, the added water 20) separate and distinct from one another, as shown in FIG. 1. In this way, plant or system 10 may be configured such that the anode exhaust or tail gas 24 is prevented from mixing with the input fuel 12 (and, potentially, the added water 20). Stated differently, the plant or system 10 may be void of a fuel recycle loop in which the anode exhaust or tail gas 24 of the fuel cell 26 of the plant or system 10 is mixed with the input fuel 12 and utilized by the fuel cell 26 (e.g., the anode thereof).

As shown in FIG. 1, after the input fuel 12 (or, potentially, the water 20 and input fuel 12 mixture) is heated via the fuel pre-heater 18, the mixture of water 20 (e.g., steam) and input fuel 12 (e.g., CH4) may travel along the second pathway 22 to one or more reformer 30. The reformer 30 may be configured to convert at least a portion of the mixture of the heated input fuel 12 and added water 20 (e.g., stream) into a hydrogen-rich reformate 33 or syngas mixture of hydrogen and one or more byproduct. The hydrogen-rich reformate 33 or syngas exiting or output by the reformer 30 may be cooler than the mixture of water 20 and inlet fuel 12 entering or input to reformer 30. The hydrogen-rich reformate 33 from the reformer 30 may be output along a third pathway 32. The reformer 30 may be any reformer effective in producing a hydrogen-rich reformate 33 from the mixture of water 20 and input fuel 12. In some embodiments, the reformer 30 may be a steam reformer which is configured to react the steam 20 at high temperature with the input fuel 12. In some such embodiments, the reformer 30 may be a methane reformer. In some embodiments the reformer 30 may be heated to relatively high temperatures (e.g., at least about 500 degree Celsius) and configured to react the steam 20 with the input fuel 12 in the presence of a metal-based catalyst (e.g., nickel) to yield a hydrogen-rich reformate 33 of hydrogen and one or more byproduct, such as carbon monoxide. In some embodiments, byproducts of the hydrogen-rich reformate 33 (i.e., other than hydrogen (H2)) may include carbon monoxide (CO) and carbon dioxide (CO2). As explained further below, the reformer 30 may be heated to facilitate the reforming process from burning the tail gas 24 of the fuel cell 26 in the cathode exhaust stream of the fuel cell 26 and passing the heated resultant through the reformer 30.

In some embodiments, such as the exemplary plant or system 10 embodiment shown in FIG. 1, the reformer 30 may convert only a portion or fraction of the mixture of water 20 (e.g., steam) and input fuel 12 (e.g., CH4) into the hydrogen-rich reformate 33 (i.e., H2 and one or more byproduct). In such embodiments, the byproducts of the hydrogen-rich reformate 33 may include non-utilized water 20 and non-utilized fuel 12 in addition to any other potential byproducts formed by the reformer 30 (e.g., CO and CO2).

The reformer 30 may be configured to utilize or use at least a portion of the anode exhaust or tail gas 24 given off by the fuel cell 26 to promote the reforming reaction (as explained further below). For example, as shown in FIG. 1 at least a fraction of the anode exhaust stream or tail gas 24 of the fuel cell 26 may be combusted burned, ignited or otherwise reacted within the cathode exhaust stream 34 of the fuel cell 26 of the plant or system 10 to produce heat (i.e., heat recovery of the cathode exhaust stream 34). The heat may then be utilized by the reformer 30 (i.e., the reformer is heated) to promote the reforming reaction.

As shown in FIG. 1, the hydrogen-rich reformate 33 output by the reformer 30 may travel along the third pathway 32 to the inlet of fuel cell 26 of the plant or system 10. For example, the hydrogen-rich reformate 33 may be output to the inlet of an anode of the fuel cell 26. As shown in FIG. 1, the fuel cell 26 may be positioned remote from, or adjacent to, the reformer 30 (i.e., the reformer 30 may be external to the fuel cell 26). For example, the fuel cell 26 may be provided within a housing, and the reformer 30 may be positioned exterior to the housing of the fuel cell 26 as shown in FIG. 1. Stated differently, the reformer 30 may be positioned external or remote from a housing of the fuel cell 26 as shown in FIG. 1.

The fuel cell 26 may be configured to produce electricity, such as direct current, from the hydrogen-rich reformate 33 output by the reformer 30 and input air 70. The fuel cell 26 may convert the chemical energy of the hydrogen-rich reformate 33 into electricity through a chemical reaction with oxygen or another oxidizing agent. In some embodiments the fuel cell 26 may include an anode (negative side), a cathode (positive side) and an electrolyte that allows charges to move between the two sides of the fuel cell 26. Electrons may be drawn from the anode to the cathode through an external circuit, producing direct current electricity.

In some embodiments, the fuel cell 26 may be a solid oxide fuel cell (SOFC), as shown in FIG. 1, which includes a solid oxide or ceramic electrolyte. In some such embodiments, the anode may use oxygen ions that diffuse through the electrolyte to oxidize the hydrogen-rich reformate 33 output by the reformer 30. The oxidation reaction between the oxygen ions and the hydrogen of the hydrogen-rich reformate 33 output by the reformer 30 may produce heat, water and electricity. The electrolyte of the fuel cell 26 may be a dense layer of ceramic that conducts oxygen ions. The anode of the fuel cell 26 may produce an anode exhaust stream or tail gas 24. In some embodiments, the anode exhaust stream or tail gas 24 may include hydrogen and CO. In some embodiments, the anode exhaust stream or tail gas 24 may include water, hydrogen, $CO_2$, CO and/or $CH_4$. The cathode of the fuel cell 26 may be a porous layer on the electrolyte where oxygen reduction takes place. The cathode may produce a cathode exhaust stream 34. The cathode exhaust stream 34 may substantially include $N_2$. As mentioned above, a portion of the tail gas 24 may be combusted in the cathode exhaust stream 34 to heat the cathode exhaust stream 34 and, thereby, heat the reformer 30 (as the heated cathode exhaust stream 34 is directed to the reformer 30). As described further below, the heated cathode exhaust stream 34 may also be used to heat the input air 70 of the fuel cell 26 via at least one heat exchanger 80.

As shown in FIG. 1, in some embodiments the tail gas 24 of the fuel cell 26 may be directed along a fourth pathway 36 to the fuel pre-heater 18. The tail gas 24 may be relatively hot, such as at least about 850 degrees Celsius. As described above, the fuel pre-heater 18 may recuperate the relatively hot tail gas 24 to heat the inlet fuel 12 (or a mixture of inlet water 20 and inlet fuel 12). Further, as also discussed above, the fourth pathway 36 and the fuel pre-heater 18 (as well as other components or aspects of the plant or system 10, potentially), may substantially prevent the tail gas 24 from mixing with the inlet fuel 12 (or a mixture of inlet water 20 and inlet fuel 12) or otherwise from entering or being input into the fuel cell 26 (e.g., to the anode or cathode thereof).

Upon exiting the fuel pre-heater 18, the plant or system 10 may direct the tail gas 24, such as through the use of a fifth passageway 38, to an inlet of an air pre-heater 40 as shown in FIG. 1. Like the fuel pre-heater 18, the air pre-heater 40 may be a recuperator or heat exchanger. As shown in FIG. 1, the air pre-heater 40 may utilize the anode exhaust or tail gas 24 of the fuel cell 26 of the plant or system 10 to heat input air 70. The air pre-heater 40 may be configured to maintain the tail gas 24 and input air 70 separate and distinct from one another. For example, the fuel pre-heater 18 may utilize the hot tail gas 24 to heat the relatively cooler input air 70 via conduction and/or convention without mixing the tail gas and input air 70.

As shown in FIG. 1 the plant or system 10 may include a water separator or condenser 44 configured to remove water (H2O) from the tail gas 24. For example, as shown in the exemplary illustrative embodiment of FIG. 1, the plant or system 10 may include a sixth passageway 42 that directs the tail gas 24 from the output of the air pre-heater 40 to the input of the water separator or condenser 44. The water separator or condenser 44 may be any mechanism or configuration that is effective in removing H2O from the tail gas 24. In embodiments wherein the tail gas 24 is above the boiling point of the water in the tail gas 24, the plant may include a condenser 44 to condenser and remove the water from the tail gas 24 as removed liquid water 28. In some embodiments, at least a portion of the removed water 28 separated from the tail gas 24 via the water separator 44 may be the input water 20 that was added to the input fuel 12 prior to the reformer 30 and or fuel cell 26. The water separator or condenser 44 may remove substantially all or only a portion of the water contained within the tail gas 24. For example, in some embodiments the plant or system 10 may be configured such that the water separator or condenser 44 removed at least about 75 percent of the water contained within the tail gas 24. As another example, the plant or system 10 may be configured such that the water separator or condenser 44 removed at least about 95 percent of the water contained within the tail gas 24.

The water separator or condenser 44 may output (i.e., provide downstream) residual tail gas 46 that contains less water therein as compared to the un-treated tail gas 24 input (i.e., that is upstream) to the separator or condenser 44. The residual tail gas 46 may be directed along a seventh or residual tail gas pathway 48 that diverts, splits or otherwise separates the residual tail gas 46 into two or more portions, as shown in FIG. 1. With reference to FIG. 1, the plant or system 10 may be configured to divert a first portion 50 of the residual tail gas 46 and a second portion 52 of the residual tail gas 46. The respective amounts or proportions of the first and second portions 50, 52 of the residual tail gas 46 may vary depending upon scale, desired operating parameters, and the like. In some embodiments, the first portion 50 may contain the majority (i.e., over 50%) of the residual tail gas 46. In some such embodiments, the first portion 50 may contain at least 75% of the residual tail gas 46. In some other embodiments, the second portion 52 may contain the majority (i.e., over 50%) of the residual tail gas 46.

As shown in FIG. 1, the first portion 50 of the residual tail gas 46 may be input to at least one bottoming cycle 54, such as via a passageway. The bottoming cycle 54 may be configured to utilize the residual tail gas 46 to produce an additional electrical energy in addition to the fuel cell 26. In some embodiments, the residual tail gas 46 may drive a combustor of a combustion engine of the bottoming cycle 54. The combustion engine may be utilized in conjunction with a generator or like mechanism to produce additional electricity. In some embodiments, the combustion engine of the bottoming cycle may be a reciprocating engine, Rankine cycle, Brayton cycle, and/or sterling cycle. In some embodiments the reciprocating engine may be a reciprocating 4-stroke, reciprocating 2-stroke, opposed piston 2-stroke and/or gas turbine. According to another embodiment, heat from the bottoming cycle 54 exhaust may be transferred to the first tail gas portion 50 via a return path to further boost the production of electrical power provided by the bottoming cycle 54. In some embodiments the system or plant 10 may include a CO2 separation mechanism configured to remove CO2 from the first portion 50 of the residual tail gas 46 prior to the input of the bottoming cycle 54, such as the input of a combustion engine.

As discussed above, as shown in the exemplary illustrative embodiment of FIG. 1 the second portion 52 of the residual tail gas 46 may be added to the cathode exhaust stream 34 of the fuel cell 12 of the plant or system 10. In some embodiments the second portion 52 of the residual tail gas 46 may be added to the cathode exhaust stream 34 of the fuel cell 12 upstream of the reformer 30. In some embodiments the second portion 52 of the residual tail gas 46 may be combusted burned, ignited or otherwise reacted within the cathode exhaust stream 34 of the fuel cell 12 of the plant or system 10 to produce heat (i.e., heat recovery of the cathode exhaust stream 34). For example, an eighth passageway 58 may direct the second portion 52 of the residual tail gas 46 to a combustion point 56 along the cathode exhaust stream 34 located downstream of the fuel cell 26 and upstream of the at least one heat exchanger 80 and, potentially, the reformer 30. In some embodiments, the cathode exhaust stream 34 may substantially include $N_2$. The combustion point 56 of the second portion 52 of the residual tail gas 46 in the cathode exhaust stream 34 downstream of the fuel cell 26 and upstream of at least one of the at least one heat exchanger 80 and reformer 30 may include any arrangement or configuration effective in combusting the second portion 52 of the residual tail gas 46 in the cathode exhaust stream 34. In some embodiments, the temperature of the cathode exhaust stream 34 may be sufficient to ignite or burn the second portion 52 of the residual tail gas 46. In some embodiments, the plant or system 10 may include an ignition mechanism for burning the second portion 52 of the residual tail gas 46 in the cathode exhaust stream 34.

In some embodiments, the heat from the combustion of the second portion 52 of the residual tail gas 46 may be directed to the reformer 30 (i.e., the reformer is heated) to promote the reforming reaction of the mixture of input water 20 and input fuel 12. In this way, the tail gas 24 of the fuel cell 26 may be utilized as a catalyst for reforming (e.g., steam reforming) the input fuel 12 into the hydrogen-rich reformate 33. In some embodiments inputting the second portion 52 of the residual tail gas 46 to the cathode exhaust stream 34 upstream of the at least one heat exchanger 80 allows the residual tail gas 46 to be recuperated without adding the residual tail gas 46 (i.e., fuel or combustion products) to the inlet of the cathode of the fuel cell 26.

As shown in FIG. 1, in some alternative embodiments the second portion 52 of the residual tail gas 46 may be added to the cathode exhaust stream 34 of the fuel cell 12 downstream of the reformer 30 and upstream of the at least one heat exchanger 80. In some such embodiments, the second portion 52 of the residual tail gas 46 may be added both upstream and downstream of the reformer 30. In some embodiments the second portion 52 of the residual tail gas 46 may be combusted burned, ignited or otherwise reacted within the cathode exhaust stream 34 of the fuel cell 12 of the plant or system 10 to produce heat (i.e., heat recovery of the cathode exhaust stream 34). For example, an alternative eighth passageway 58' may direct the second portion 52 of the residual tail gas 46 to a combustion point 56' along the cathode exhaust stream 34 located downstream of the fuel cell 26 and reformer 30, and upstream of the at least one heat exchanger 80. The combustion point 56' of the second portion 52 of the residual tail gas 46 in the cathode exhaust stream 34 downstream of the fuel cell 26 and reformer 30, and upstream of the at least one heat exchanger 80, may include any arrangement or configuration effective in combusting the second portion 52 of the residual tail gas 46 in the cathode exhaust stream 34. In some embodiments, the temperature of the cathode exhaust stream 34 may be sufficient to ignite or burn the second portion 52 of the residual tail gas 46. In some embodiments, the plant or system 10 may include an ignition or oxidation mechanism for burning the second portion 52 of the residual tail gas 46 in the cathode exhaust stream 34.

In some embodiments the plant or system 10 may include input air 70, as shown in FIG. 1. The input air 70 may be fed to the fuel cell 26, such as to the cathode of the fuel cell 26. In some embodiments, the plant or system 10 may include one or more air blower 72 effective in pressurizing or otherwise translating a particular amount or rate of the input air 70 along a ninth pathway 74 (and potentially through other pathways or aspects of the plant or system 10 that are positioned or arranged downstream of the air blower 72). Operating parameters of the air blower 72 may be dependent upon the requirements or operating parameters of the plant or system 10 (e.g., energy output). In some embodiments, the air blower 72 may be configured to output the air 70 and increase the pressure of the input air 72 (e.g., within the output ninth passageway 74) to at least about 2 atmospheres. As shown in FIG. 1 and described above, the input air 72 may be directed to the air pre-heater 40. The air pre-heater 40 may utilize the tail gas 36 to heat the input air 70 downstream of the blowers 72. In some embodiments, the input air 72 may be heated by the air pre-heater 40 (via the tail gas 36) to at least about 100 degrees Celsius.

In some embodiments, as shown in FIG. 1, the plant or system 10 may include one or more air-to-air heat exchanger 80 configured to recuperate the heat of the cathode exhaust stream 34 to heat the input air 70. In some embodiments, as shown in the exemplary illustrative embodiments shown in FIG. 1 the at least one air-to-air heat exchanger 80 may be positioned immediately downstream of the air pre-heater 40. A passageway 76 may extend between the outlet of the air pre-heater 40 and the at least one heat exchanger 82 to direct the pre-heated input air 70 to the at least one heat exchanger 80. In some embodiments, the at least one air-to-air heat exchanger 80 (and cathode exhaust stream 34) may be configured to heat the input air 70 to at least about 500 degrees Celsius. In some embodiments, the at least one air-to-air heat exchanger 80 (and cathode exhaust stream 34) may be configured to heat the input air 70 to at least about 700 degrees Celsius. In some embodiments, the at least one air-to-air heat exchanger 80 (and cathode exhaust stream 34) may be a single or unitary air-to-air heat exchanger.

As also shown in FIG. 1, the plant or system 10 may include multiple air-to-air heat exchangers coupled in series, such as a first low temperature heat exchanger 82 and a second high temperature heat exchanger 84. Each of the first low temperature heat exchanger 82 and second high temperature heat exchanger 84 may utilize the relatively hot cathode exhaust stream 34 to heat the input air 70. As shown in FIG. 1, the second high temperature heat exchanger 84 may be positioned upstream of the first low temperature heat exchanger 82 in the direction of the flow of the input air 70 and downstream in the direction of the flow of the cathode exhaust 34. In this way, the second high temperature heat exchanger 84 may operate at a higher temperature as compared to the first low temperature heat exchanger 82. In some embodiments, the first low temperature heat exchanger 82 and the second high temperature heat exchanger 84 may be made of differing materials, such as the components thereof effective in transferring heat between the cathode exhaust stream 34 and the input air 70. In some embodiments, the second high temperature heat exchanger 84 may be configured to more efficiently transfer heat from the cathode exhaust 34 to the input air 70 as compared to the first low temperature heat exchanger 82.

The input air 70 heated by the at least one heat exchanger 80 may be output to an inlet of the fuel cell 26. For example, a passageway 86 may extend between the outlet of the at least one heat exchanger 80 to the cathode inlet of the fuel cell 26. In some embodiments the input air 70 heated by the at least one heat exchanger 80 may be mixed with the inlet fuel 12 upstream of the fuel cell 26. The heated input air 70 may be effective, at least in part, to heat the fuel cell 26 such that the fuel cell can efficiently operate. For example, the fuel cell 26 may be a SOFC fuel cell and the heated input air 70 may be effective, at least in part (e.g., along with the heated inlet fuel 12), to heat the SOFC fuel cell to at least about 500 degrees Celsius. In some embodiments, the fuel cell 26 may be a SOFC fuel cell and the heated input air 70 may be effective, at least in part (e.g., along with the heated inlet fuel 12), to heat the SOFC fuel cell to at least about 800 degrees Celsius.

The cathode exhaust stream 34 may exit the fuel cell 26 and be directed to the combustion point 56, as described above and shown in FIG. 1. As also discussed above, the resulting heated composition may be directed to and through the reformer 30 to facilitate the reforming of the inlet fuel 12 into the hydrogen-rich reformate 33 utilized by the fuel cell 26. While the cathode exhaust stream 34 may lose heat to the reformer, the cathode exhaust stream 34 exiting the reformer 30 may still be relatively hot. For example, the cathode exhaust stream 34 exiting the reformer 30 may be relatively hotter than the heated input air 70 output by the air pre-heater 40. As such, in some embodiments the cathode exhaust stream 34 exiting the reformer 30 may be directed to the at least one heat exchanger 80 to heat the heated input air 70 output by the air pre-heater 40 before entering the fuel cell 26. In this way, the heat provided by burning the second portion 52 of the tail gas 24 of the fuel cell 26 to heat the reformer 30 may be recuperated to heat the input air 70.

In some embodiments, the cathode exhaust stream 34 exiting the reformer 30 may be at least about 800 degrees Celsius. In some embodiments, the cathode exhaust stream 34 exiting the reformer 30 may be at least about 850 degrees Celsius. As shown in FIG. 1, the plant or system 10 may include a tenth passageway 88 that directs the cathode exhaust stream 34 output by the reformer 30 to the input of the at least one heat exchanger 80. For example, the tenth passageway 88 may direct the cathode exhaust stream 34 output by the reformer 30 to the input of the high temperature heat exchanger 84. From the high temperature heat exchanger 84, the cathode exhaust stream 34 may be directed or flow to the low temperature heat exchanger 82.

In some alternative embodiments the plant or system 10 may be configured to direct at least a portion 87 of the cathode exhaust stream 34 to the inlet fuel 12. As shown in FIG. 1, at least a portion 87 of the cathode exhaust stream 34 may be added to the inlet fuel 12 upstream of the fuel cell 26. As also shown in FIG. 1, at least a portion 87 of the cathode exhaust stream 34 may be added to the inlet fuel 12 upstream of the fuel cell 26 and downstream of the reformer 30 (e.g., when the fuel cell 26 and the reformer 30 are remote from one another). In some embodiments (see FIG. 2, for example), at least a portion 87 of the cathode exhaust stream 34 may be added to the inlet fuel 12 into or upstream of both the reformer 30 and the fuel cell 26 (or within the reformer 30), as shown in FIG. 1.

As shown in FIG. 1, the plant or system 10 may be configured to direct the cathode exhaust stream 34 to a boiler 92. For example, an eleventh passageway 90 may direct the cathode exhaust stream 34 output by the at least one heat exchanger 80 to the input of the boiler 92. In some embodiments, the cathode exhaust stream 34 output by the at least one heat exchanger 80 may be at least about 100 degrees Celsius. The cathode exhaust stream 34 output by the at least one heat exchanger 80 may thereby be utilized by the boiler 92 to heat input liquid water to create steam 20. In some embodiments the steam created by the boiler 92 may be the input steam (or water) 20 that is mixed with the input fuel 12 and ultimately input in to the reformer 30 to from the hydrogen-rich reformate 33. After being utilized by the boiler 92 to form input steam or water 20, the cathode exhaust stream 34 output by the boiler 2 may be vented 94 to the atmosphere or otherwise removed from the plant or system 10.

In some embodiments, the water heated and boiled by the boiler 92 may be at least in part the removed water 28 from the anode exhaust stream or tail gas 24. For example, at least a portion of the removed water 28 from the anode exhaust stream or tail gas 24 via the water separator or condenser 44 may be directed to an inlet of the boiler 92. As shown in FIG. 1, in some embodiments the water 28 removed or separated from the anode exhaust stream or tail gas 24 may be split or portioned such that a first portion is directed to the boiler 92 and the remaining portion is drained or otherwise removed from the plant or system 10. For example, as show in FIG. 1 the plant or system 10 may include a twelfth passageway 98 for directing a first portion of the water 28 outlet of the separator or condenser 44 to the boiler 92, and a thirteenth passageway 96 for directing a second portion of the water 28 outlet of the separator or condenser 44 to the atmosphere or otherwise remote of the plant or system 10.

The embodiments described herein advantageously have achieved overall fuel utilization greater or higher than 65% by adding fuel (e.g., residual tail gas 46) to the inlet air stream (e.g., to the cathode exhaust stream 34) of the reformer 30 and removing water from the tail gas 24 and recycling the removed water 20 into the fuel inlet stream 12. In some embodiments the advantageous fuel utilization is achieved by adding air (e.g., the cathode exhaust stream 34) to the fuel stream (e.g., the hydrogen-rich reformate 33 output by the reformer 30) and removing water from the tail gas 24 and recycling the removed water 20 into the fuel inlet stream 12.

Figure 2:
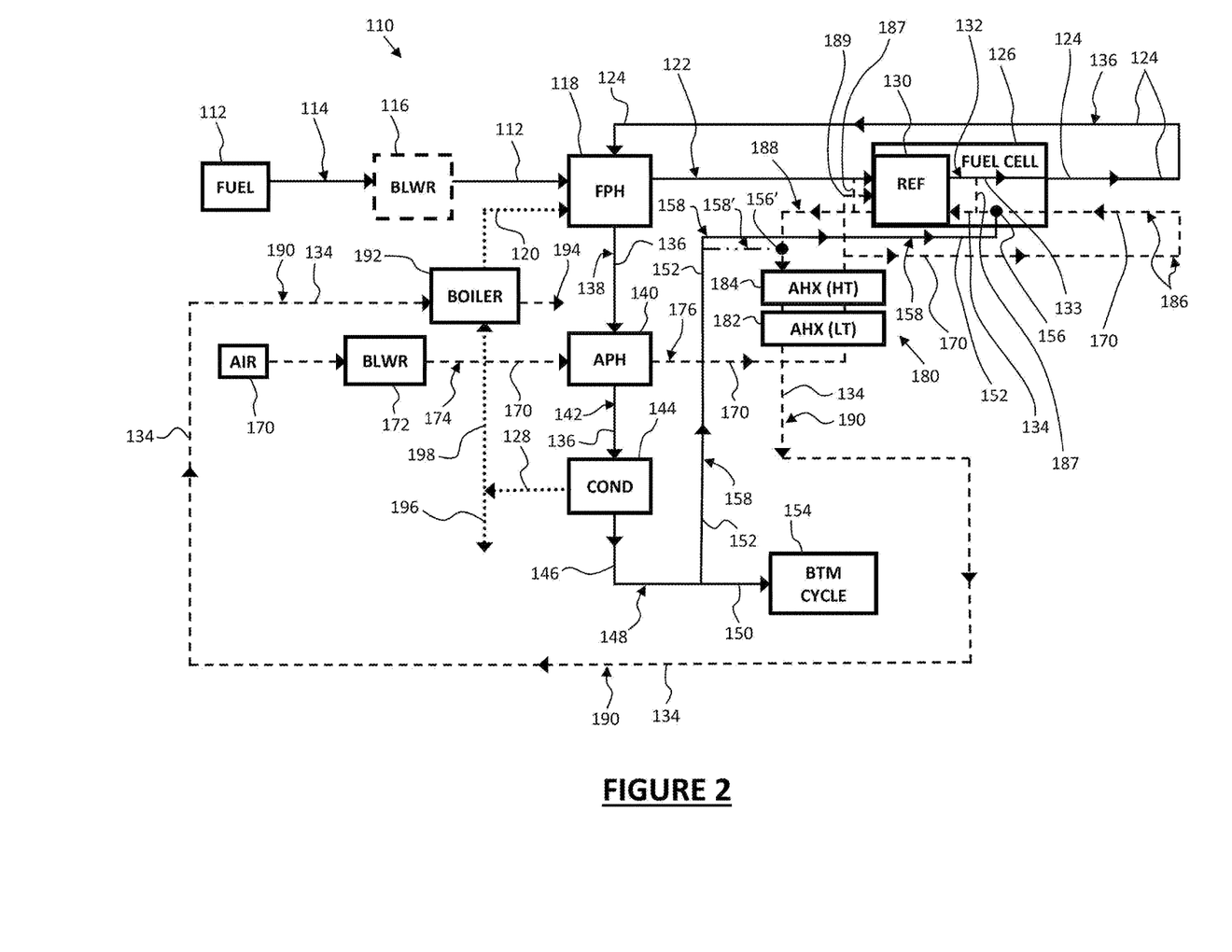
FIG. 2 is a diagram illustrating a combined cycle power plant or system that employs a solid-oxide fuel cell (SOFC) and a partial oxidation reformer according to another embodiment of the disclosure.

A second exemplary illustrative embodiment of a combined cycle system or plant for power generation is shown in FIG. 2 and referenced generally by reference numeral 110. The exemplary system or plant 110 is similar to the exemplary system or plant 10 described above and shown in FIG. 1 and therefore like reference numerals preceded by the numeral "1" are used to indicate like elements. The description above with respect to the system or plant 10, including description regarding alternative embodiments (i.e., modifications, variations or the like), equally applies to system or plant 110 (and any alternative embodiments thereof).

As shown in FIG. 1, a difference between the exemplary system or plant 110 of FIG. 2 from the exemplary system or plant 10 of FIG. 1 includes the configuration, arrangement and/or orientation of the reformer 130 and fuel cell 126. As shown in FIG. 1, the reformer 130 may be positioned within, or internal to, the fuel cell 126. For example, the fuel cell 126 may be provided within a housing, and the reformer 130 may be positioned within the confines of the housing of the fuel cell 126, as shown in FIG. 1. Stated differently, the reformer or the reforming process of the input fuel 12 may take place within the fuel cell 126 itself, as opposed to taking place exterior to the fuel cell 126 and the hydrogen-rich reformate 33 resulting therefrom being input to the fuel cell 126. In some embodiments, the reformer 130 may include at least one component or aspect of the fuel cell 126. In some embodiments, the reformer 130 may include or utilize the anode of the fuel cell 126 and the steam reforming process may take place at the anode of the fuel cell 126. In some embodiments, the reformer 130 and/or reforming process is inside an SOFC stack of the fuel cell 126.

In some embodiments, the reformer 130 may be a partial oxidation reformer 130. In some such embodiments, the system 110 may be configured to introduce or mix at least a portion of air (or other source of oxygen) with the mixture of input fuel 112 and water 120 being input to the reformer 130 (or introduced into the input fuel 112, or fuel 112 and water 120 mixture, within the reformer 130). For example, as shown in FIG. 2, a portion 189 of the input air 170 output by the at least one heat exchanger 180 (i.e., heated by the at least one heat exchanger 180) may be introduced into the input fuel 112 (or fuel 112 and water 120 mixture) upstream of the reformer 130 or within the reformer 130. In some embodiments, the air or oxygen source mixed with the input fuel 112 (or fuel 112 and water 120 mixture) within, or upstream of, the reformer 130 (e.g., the input air 170 output by the by the at least one heat exchanger 180) may be output within the hydrogen-rich reformate 133, and, eventually, within the tail gas 124 of the fuel cell 126.

In some alternative embodiments, the portion 189 of the input air 170 mixed with the input fuel 112 (or fuel 112 and water 120 mixture) within, or upstream of, the reformer 130 may be a portion 187 of the cathode exhaust 134. In some alternative embodiments, the portion 189 of the input air 170 mixed with the input fuel 112 (or fuel 112 and water 120 mixture) within, or upstream of, the reformer 130 may be the input air 170 upstream of the at least one heat exchanger 180. In some alternative embodiments, the portion 189 of the input air 170 mixed with the input fuel 112 (or fuel 112 and water 120 mixture) within, or upstream of, the reformer 130 may be the input air 170 upstream of the air pre-heater 140. In some alternative embodiments, the air 189 mixed with the input fuel 112 (or fuel 112 and water 120 mixture) within, or upstream of, the reformer 130 may be air obtained from a source external to the system (i.e., not fed from another component of the system 110).

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A combined cycle fuel cell system comprising:
a solid-oxide fuel cell comprising an anode configured to generate a tail gas, and a cathode configured to generate a cathode exhaust stream;
a reforming system configured to receive and output at least a portion of the cathode exhaust stream and convert at least a portion of a mixture of input hydrocarbon fuel and input steam into a hydrogen-rich reformate, the hydrogen-rich reformate being utilized by the anode of the fuel cell;
a water separator configured to receive the tail gas of the fuel cell and remove water from the tail gas to form residual tail gas, the water removed from the tail gas being directed to the reforming system as steam to form at least a portion of the input steam;
a bottoming cycle downstream from the reforming system and the water separator wherein the bottoming cycle comprises at least one of a reciprocating engine, a Rankine cycle engine, a Brayton cycle engine, and/or a sterling cycle engine; and
a residual tail gas pathway configured to divert a first portion of the residual tail gas from the water separator to the bottoming cycle to drive the bottoming cycle, wherein the solid-oxide fuel cell receives input air that is heated by multiple heat exchangers coupled in series, wherein the system includes a boiler configured to receive the water removed from the tail gas by the water separator and produce the input steam, at least a portion of the cathode exhaust stream output by the reforming system is directed to the boiler to heat the water removed from the tail gas by the water separator to produce the input steam, and at least a portion of the cathode exhaust stream output by the reforming system and directed to the boiler passes through the multiple heat exchangers positioned upstream of the boiler.

2. The system of claim 1, wherein the reforming system is external to the fuel cell.

3. The system of claim 1, wherein the reforming system is contained at least partially within the fuel cell.

4. The system of claim 1, wherein a portion of the cathode exhaust is mixed with at least one of the input hydrocarbon fuel and the hydrogen-rich reformate upstream of the fuel cell.

5. The system of claim 1, wherein the second portion of the residual tail gas is directed to and burned in the cathode exhaust stream upstream of the multiple heat exchangers.

6. The system of claim 5, wherein the multiple heat exchangers comprise a first low temperature heat exchanger and a second high temperature heat exchanger, and the second high temperature heat exchanger is positioned upstream of the first low temperature heat exchanger in the direction of the flow of the input air and downstream in the direction of the flow of the cathode exhaust stream.

7. The system of claim 6, wherein the first low temperature heat exchanger and the second high temperature heat exchanger are made of different materials.

8. The system of claim 1, wherein the solid-oxide fuel cell receives input air, and wherein the system includes an air pre-heater configured to transfer heat from the tail gas of the fuel cell to the input air without mixing the input air and tail gas.

9. The system of claim 8, wherein system includes an air blower upstream of the air pre-heater configured to transfer the input air at least to the air pre-heater and from the air pre-heater to the fuel cell.

10. The system of claim 1, wherein the system further comprises
- a first pathway from the anode of the fuel cell to a fuel pre-heater wherein the first pathway is configured to transfer the tail gas to the fuel pre-heater, wherein the fuel pre-heater 1) comprises a recuperator or a heat exchanger and 2) is configured to receive input hydrocarbon fuel and to transfer heat from the tail gas to the input hydrocarbon fuel; and
- a second pathway from the fuel pre-heater to the reforming system wherein the second pathway is configured to transfer input hydrocarbon fuel from the fuel pre-heater to the reforming system.

11. The system of claim 1, in the absence of at least one of a fuel recycle loop or an air recycle loop.

12. The system of claim 1, wherein the system is configured to prevent the tail gas and the residual tail gas from being input into the anode and cathode of the fuel cell.

* * * * *